US011132351B2

(12) United States Patent
Dasgupta et al.

(10) Patent No.: US 11,132,351 B2
(45) Date of Patent: Sep. 28, 2021

(54) EXECUTING TRANSACTIONS BASED ON SUCCESS OR FAILURE OF THE TRANSACTIONS

(71) Applicant: HEWLETT PACKARD ENTERPRISE DEVELOPMENT LP, Houston, TX (US)

(72) Inventors: Subhajit Dasgupta, Austin, TX (US); Charles Scot Greenidge, Ft. Collins, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 140 days.

(21) Appl. No.: 15/754,482

(22) PCT Filed: Sep. 28, 2015

(86) PCT No.: PCT/US2015/052741
§ 371 (c)(1),
(2) Date: Feb. 22, 2018

(87) PCT Pub. No.: WO2017/058148
PCT Pub. Date: Apr. 6, 2017

(65) Prior Publication Data
US 2018/0253462 A1    Sep. 6, 2018

(51) Int. Cl.
*G06F 16/23*    (2019.01)
*G06F 11/14*    (2006.01)
(Continued)

(52) U.S. Cl.
CPC .......... *G06F 16/2365* (2019.01); *G06F 11/07* (2013.01); *G06F 11/0745* (2013.01);
(Continued)

(58) Field of Classification Search
CPC ...... G06F 16/2365; G06F 11/14; G06F 11/07; G06F 11/0745; G06F 11/0793; G06F 11/1402; G06F 16/1865
See application file for complete search history.

(56) References Cited

U.S. PATENT DOCUMENTS 5,819,273 A  * 10/1998  Vora .................. G06F 16/338
7,426,559 B2    9/2008   Hamel et al.
(Continued)

FOREIGN PATENT DOCUMENTS

EP      1380948 A2    1/2004
JP      2006079251 A  3/2006

OTHER PUBLICATIONS

Armand Wilson, "Distributed Transactions and Two-phase Commit," SAP White Paper, Oct. 15, 2004, pp. 1-39, SAP AG.
(Continued)

*Primary Examiner* — Cam Y T Truong
(74) *Attorney, Agent, or Firm* — Hewlett Packard Enterprise Patent Department

(57) ABSTRACT

Example implementations relate to executing transactions based on success or failure of the transactions. For example, a management module of a computing system can execute a transaction that requests access to system resources and determine if the transaction fails or succeeds. The management module can execute a first set of actions, in response to determining that the transaction succeeds, and execute a second set of actions, in response to determining that the transactions fails.

15 Claims, 4 Drawing Sheets

(51) Int. Cl.
*G06F 11/07* (2006.01)
*G06F 16/18* (2019.01)
(52) U.S. Cl.
CPC .......... *G06F 11/0793* (2013.01); *G06F 11/14* (2013.01); *G06F 11/1402* (2013.01); *G06F 16/1865* (2019.01)

(56) References Cited

U.S. PATENT DOCUMENTS

| | | | |
|---|---|---|---|
| 7,546,576 B2 | 6/2009 | Egli | |
| 8,965,861 B1 | 2/2015 | Shalla et al. | |
| 2004/0068501 A1* | 4/2004 | McGoveran | G06F 11/1474 |
| 2008/0082454 A1* | 4/2008 | Dilip | G06Q 20/10 |
| | | | 705/76 |
| 2010/0174863 A1* | 7/2010 | Cooper | G06F 16/27 |
| | | | 711/113 |
| 2010/0218185 A1* | 8/2010 | Ralev | G06Q 20/401 |
| | | | 718/100 |
| 2011/0055835 A1 | 3/2011 | Dennis et al. | |
| 2011/0106760 A1 | 5/2011 | Corkill et al. | |
| 2011/0145204 A1* | 6/2011 | Maple | G06F 9/466 |
| | | | 707/682 |
| 2013/0339169 A1 | 12/2013 | Perach | |
| 2015/0012417 A1* | 1/2015 | Joao | G06Q 20/382 |
| | | | 705/39 |
| 2015/0178696 A1* | 6/2015 | Christner | G06Q 20/10 |
| | | | 705/39 |
| 2015/0378845 A1* | 12/2015 | Shang | G06Q 20/401 |
| | | | 718/100 |

OTHER PUBLICATIONS

Giuseppe Valetto, "Orchestrating the Dynamic Adaptation of Distributed Software with Process Technology," Columbia University, 2004, pp. 1-243.

International Search Report and Written Opinion, International Application No. PCT/US2015/052741, dated Jun. 29, 2016, pp. 1-10, KIPO.

* cited by examiner

EXECUTING TRANSACTIONS BASED ON SUCCESS OR FAILURE OF THE TRANSACTIONS

BACKGROUND

A transaction is an information or business process that is divided into individual indivisible operations. A transaction succeeds or fails as a complete unit and may not be partially complete. Transaction processing is designed to maintain a system's integrity (e.g., a database or file system) in a known, consistent state, by ensuring that operations on the system are either all completed successfully or all canceled successfully.

BRIEF DESCRIPTION OF THE DRAWINGS

Some examples of the present application are described with respect to the following figures.

DETAILED DESCRIPTION

Figure 1:
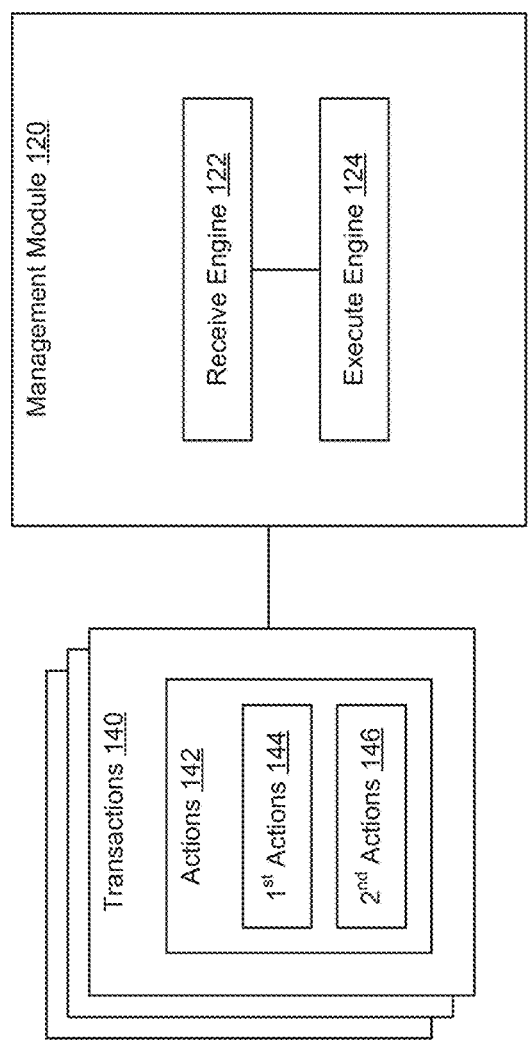
FIG. 1 is a block diagram of an example system for executing transactions based on success or failure of the transactions.

As described above, a transaction is an individual, indivisible operation, where each transaction succeeds or fails as a complete unit. Transactions ensure that data-oriented resources are not permanently updated unless all operations (or actions) within the transactional unit complete successfully. By combining a set of related operations into a unit that either completely succeeds or fails, error recovery can be simplified and reliability can be significantly improved. As an example, a database transaction is a unit of work performed within a database management system against a database, and treated in a coherent and reliable way independent of other transactions.

In transaction processing, some actions on transactional and non-transactional resources may need to be performed only if the underlying transaction completes successfully, but not otherwise. Similarly, some other actions may need to be performed (e.g., cleanup of intermediate changes or work performed on non-transactional resources), if the underlying transaction fails. As used herein, "transactional resources" are resources that support the notion of "start" and "end" temporal boundaries such that changes to resource recorded between the start and end signals are either all permanently recorded or none are permanently recorded, when the end signal is applied. Examples of transactional resources include database management systems or message queues. As used herein, "non-transactional resources" are resources that immediately and permanently record changes. Examples of non-transactional resources include files, network sockets, and external system. Accordingly, it may be desirable to make coordinated changes to both internal and external resources of a system as part of a transaction processing solution.

Examples described herein provide a solution for coordinating changes to internal and external system resources during transaction processing. The solution allows dynamic specification of a series of actions (e.g., callback actions), while a transaction executes, that are conditionally executed depending upon the eventual disposition of the transaction (i.e., succeed or fail). The described solution treats resources, both internal and external (including remote resources), cohesively as if they were all being managed by a single entity to maintain orderly, correct and comprehensively consistent changes to the system's internal and external resources. During execution of a transaction, the transaction may be recorded as "success" or "failure" and actions within the transaction can be performed based on the success or failure of the transaction. For example, if the transaction succeeds, certain actions such as a "commit" action can be executed. Otherwise, if the transaction fails, other actions such as a "rollback" action can be executed. As used herein, a transaction "commit" action applies all data manipulations within the scope of the transaction and persists the results to the database. Conversely, if an error occurs during the transaction, or if the user specifies a rollback action, the data manipulations within the transactions are not persisted to the database.

In one example, a method executable by a management module of a computing system includes executing a transaction requesting access to system resources and determining if the transaction fails or succeeds. The method also includes executing a first set of actions, in response to determining that the transaction succeeds, and executing a second set of actions, in response to determining that the transaction fails.

In another example, a system includes a management module. The management module includes a receive engine to receive a plurality of transactions requesting access to system resources, where each transaction includes a plurality of actions to be executed. The management module also includes an execution engine to concurrently execute the transactions to determine if the transactions succeed or fail. For each transaction that succeeds, the management module is to execute a first set of actions of the successful transaction. For each transaction that fails, the management module is to execute a second set of actions of the failed transaction.

In another example, a non-transitory machine-readable storage medium encoded with instructions executable by a processor of a management module includes instructions to execute a transaction to determine whether the transaction fails or succeeds, where the transaction includes a plurality of actions to be performed on a plurality of system resources. The medium includes instructions to execute a first set of actions of the plurality of actions based on a determination that the transaction succeeds, and to execute a second set of actions of the plurality of actions based on a determination that the transaction fails.

Referring now to the figures, FIG. 1 is a block diagram of an example system for executing transactions based on success or failure of the transactions. System 100 can be any type of computing system such as a portable computer or communication device, a server computer, etc. System 100 can include a number of components including a management module 120. System 100 can include additional components (not shown) such as a central processing unit (CPU), memory device, power supply, display, other hardware, software applications, a plurality of input/output (I/O) ports and interfaces, etc.

Management module 120 can be implemented in software, firmware, and/or hardware. For example, management module 120 can be a microprocessor, a microcontroller, or a discrete logic module, among others. Management module 120 can include a receive engine 122 and an execute engine 124. Management module 120 can include additional or fewer engines than illustrated to perform the various functions as will be described in further details.

Receive engine 122 can receive a plurality of transactions 140 that request access to resources of the system 100. System resources can include internal and external resources. For example, internal resources can include a database, applications, and internal message queues, among others. External resources can include, for example, network devices, server devices, storage devices, external message queues, and other physical devices, among others. In certain examples, internal resources may be resources available to and managed by the system 100 and external resources may include resources available to, but not managed (directly or indirectly) by the system 100. In some examples, the transactions may request access to the resources to change the resources (i.e., change a state of the resources).

Execution engine 124 can concurrently execute the transactions to determine if the transactions succeed or fail. For example, execution engine 124 can determine that a transaction fails if an error occurs during execution of the transaction. Execution engine 124 can also determine that a transaction succeeds if no errors occur during execution of the transaction. In other examples, execution engine 124 can determine that a transaction fails if changes requested by the transaction cannot be successfully stored in persistent storage. Similarly, the execution engine 124 can determine that a transaction fails if changes requested by the transaction can be successfully stored in persistent storage.

During execution of the transaction, execution engine 124 can extract and store a plurality of actions 142 associated with each transaction. Execution engine 124 can determine a first set of actions 144 of the plurality of actions to be performed for each transaction that succeeds and a second set of actions 146 of the plurality of actions to be performed for each transaction that fails. Accordingly, for each transaction that succeeds, execution engine 124 can execute the first set of actions 144 corresponding to each successful transaction, and execute a second set of actions 146 corresponding to each transaction that fails. For example, first set of actions 144 that are executed for successful transactions can include changes to a database of the system 100, call to external processes, write operations to sockets and files, actions on physical devices, and messaging and notification actions (e.g., notifying a user that the transaction was successful), among others. Second set of actions 146 that can be executed for transactions that fail include, for example, denying access to the requested system resources, deleting temporary filed created during execution of the transaction, generating a failure indication (e.g., failure message to the user), and discarding changes made to databases of the system 100, among others. In other examples, the first set of actions 144 can include a commit action to apply all data manipulations within the scope of the transactions and persist the results to the database. In such examples, the second set of actions 146 can include a rollback action where data manipulations within the transactions are not persisted to the database.

During execution of the transactions 140, execution engine 124 can deny access to the resources, or defer such access or actions associated with the transactions 140, until the success or failure determination is made. Accordingly, conflicting changes to shared resources can be significantly reduced or avoided. Thus, the described solution can significantly improve the correctness and consistency of system resources and can be implemented in various applications (e.g., standalone process, batch processing application script, web application, etc.) to coordinate arbitrary activities to manage processes that may or may not support the requested resources.

Figure 2:
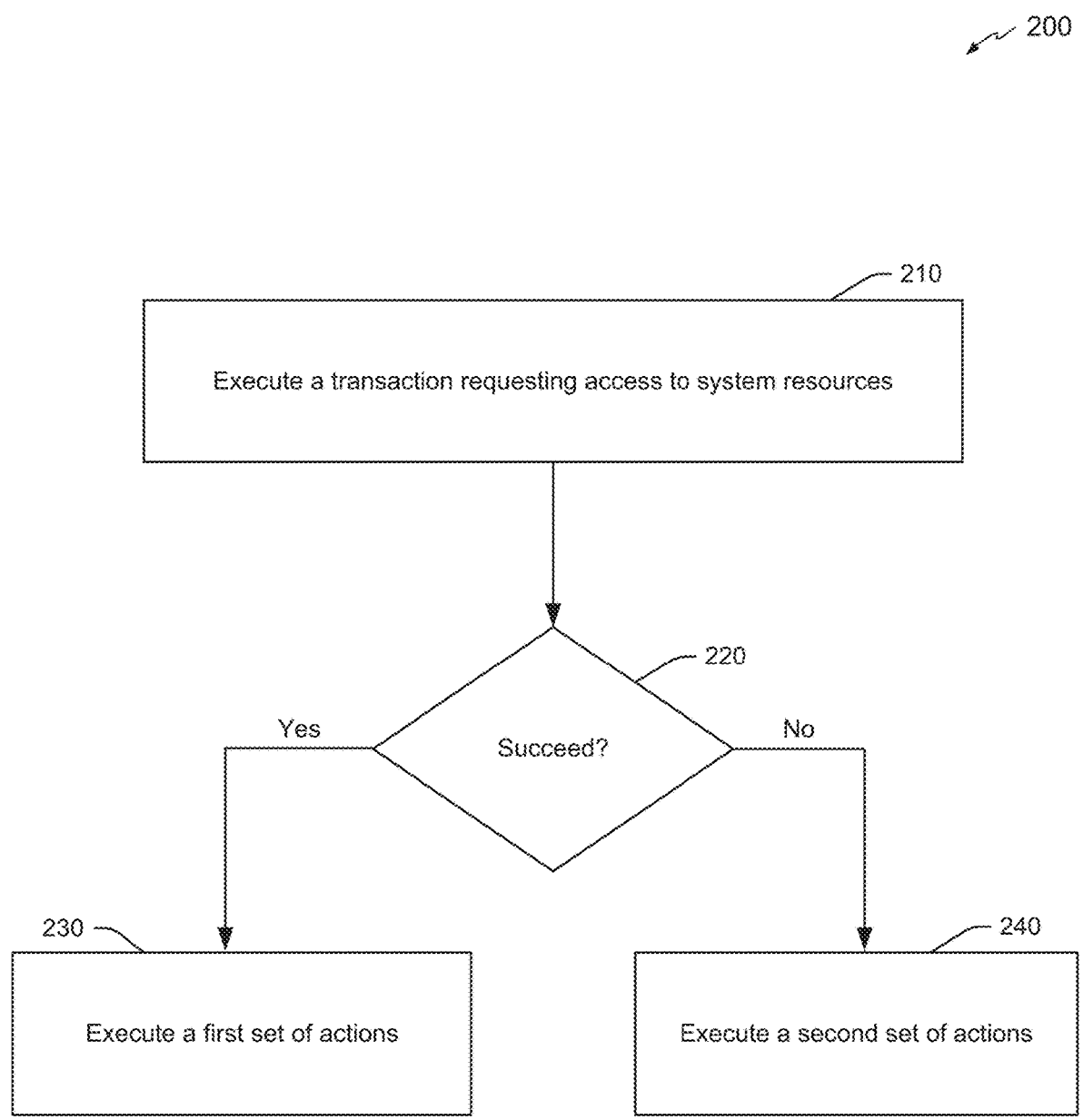
FIG. 2 is a flowchart of an example method for executing transactions based on success or failure of the transactions.

FIG. 2 is a flowchart of an example method for executing transactions based on success or failure of the transactions. Although execution of method 200 is described below with reference to management module 120, other suitable devices for execution of method 200 may be used. Method 200 can be implemented in the form of executable instructions stored on a computer-readable storage medium, such as machine-readable medium 420 of FIG. 4 and/or in the form of electronic circuitry.

Method 200 includes executing a transaction requesting access to system resources, at 210. For example, management module 120 can receive and execute a transaction 140 that is requesting access to system resources. System resources can include internal and external resources such as storage devices, network devices, databases, applications, etc.

Method 200 includes determining if the transaction fails or succeeds, at 220. For example, management module 120 can determine if the transaction fails or succeeds. The determination may be based on whether or not errors occur during execution of the transaction and/or whether changes to the resources such as a data manipulations can be successfully stored in persistent storage.

Method 200 includes executing a first set of actions, at 230, if it is determined that the transaction succeeds. For example, management module 120 can execute a first set of actions 144 of a plurality of actions 142 of the transaction based on the determination that the transaction succeeds. In some examples, the first set of actions 144 can include persisting results of data manipulations by the transaction to a database of the system, changes to databases, call to external processes, write operations (e.g., to sockets and files), actions on physical devices, and messaging and notification actions and granting access to system resources.

Method 200 includes executing a second set of actions, at 240, if it is determined that the transaction fails. For example, management module 120 can execute a second set of actions 146 of a plurality of actions 142 of the transaction based on the determination that the transaction fails. In some examples, the second set of actions 146 can include discarding results of data manipulations by the transaction, deleting temporary files created during execution of the transaction, generating a failure notification, and denying access to system resources. In some examples, the method 200 of FIG. 2 includes additional steps in addition to and/or in lieu of those depicted in FIG. 2.

Figure 3:
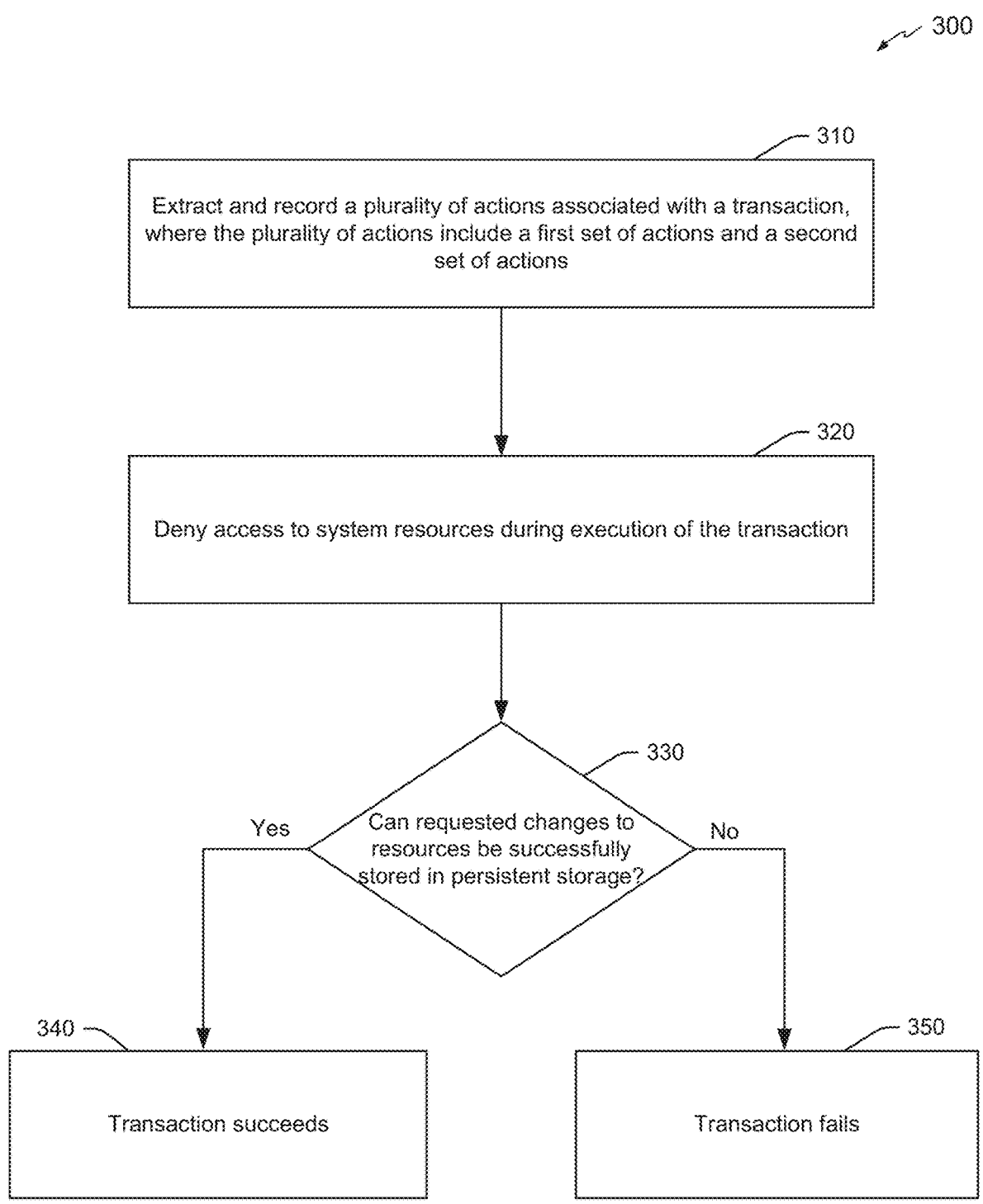
FIG. 3 is a flowchart of an example method for executing transactions based on success or failure of the transactions.

FIG. 3 is a flowchart of an example method for executing transactions based on success or failure of the transactions. Although execution of method 300 is described below with reference to management module 120, other suitable devices for execution of method 300 may be used. Method 300 can be implemented in the form of executable instructions stored on a computer-readable storage medium, such as machine-readable medium 420 of FIG. 4 and/or in the form of electronic circuitry.

Method 300 includes extracting and recording a plurality of actions associated with a transaction, where the plurality of actions include a first set of actions and a second set of actions, at 310. For example, management module 120 can extract and record (i.e., store) a plurality of actions 142 included in a transaction 140 during execution of the transaction 140.

Method 300 includes denying access to system resources during execution of the transaction, at 320. For example, management module 120 can deny access to system resources requested by the transaction during execution of the transaction at least until a determination is made as to whether the transaction succeeds or fails. In some examples, access to the system resources can be delayed or deferred until the determination is made.

Method 300 includes determining whether requested changes to the resources can be successfully stored in persistent storage, at 330. For example, management module 120 can determine if the changes to system resources requested by the transaction can be successfully stored in persistent storage. In some examples, the system resources can include a database and the changes can include changes to data in the database or data manipulations.

Method 300 includes determining that the transaction succeeds, at 340, if the changes can be successfully stored in persistent storage, and determining that the transaction fails, at 350, if the changes cannot be successfully stored in persistent storage. In some examples, the method 300 of FIG. 3 includes additional steps in addition to and/or in lieu of those depicted in FIG. 3.

Figure 4:
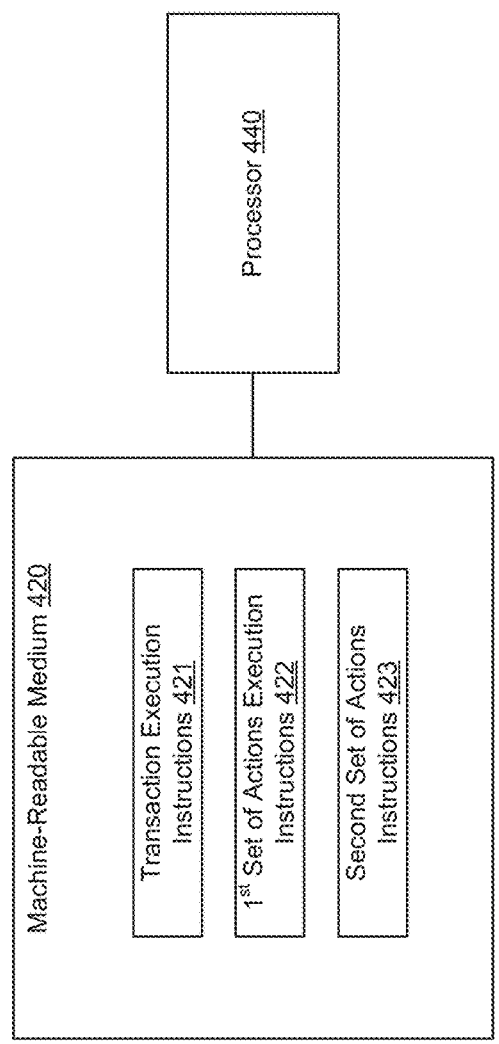
FIG. 4 is a block diagram of an example machine-readable medium having instructions executable by a processor to execute transactions based on success or failure of the transactions.

FIG. 4 is a block diagram of an example machine-readable medium having instructions executable by a processor to execute transactions based on success or failure of the transactions. Management module 400 includes a processor 440 and a non-transitory machine-readable medium 420 that stores non-transitory machine-readable instructions 421-423.

Processor 440 can be one or more central processing units (CPUs), microprocessors, and/or other hardware devise suitable for retrieval and execution of instructions stored in medium 420 to implement the functionality described below. As an alternative, or in addition to retrieving and executing instructions, processor 440 may include one or more electronic circuits comprising a number of electronic components for performing the functionality of instructions 421-423.

Medium 420 may be electronic, magnetic, optical, or other physical storage device that stores executable instructions. Medium 420 can be a computer-readable storage medium and may be, for example, random access memory (RAM), content addressable memory (CAM), ternary content addressable memory (TCAM), an electrically-erasable programmable read-only memory (EEPROM), flash memory, a storage drive, an optical disc, and the like. As described below, medium 420 may be encoded with executable instructions for enabling the management module 400 to execute transactions based on a success or failure determination of the transactions.

Transaction execution instructions 421 include instructions to execute a transaction to determine whether the transaction fails or succeeds, where the transaction includes a plurality of actions to be performed on a plurality of system resources. For example, instructions 421 can execute a transaction to determine whether the transaction succeeds or fails, and also extract and record the plurality of actions included in the transaction. In certain examples, the transaction can be determined to be successful if no errors occur during execution of the transaction. Conversely, the transaction can be determined to fail if one or more errors occur during execution of the transaction. During execution of the transaction, access to system resources can be denied until the success or failure determination is made.

First set of actions execution instructions 422 include instructions to execute a first set of actions based on a determination that the transaction succeeds. The first set of actions can include persisting results of data manipulations by the transaction to a database of the system and granting access to system resources.

Second set of actions execution instructions 423 include instructions to execute a second set of actions based on a determination that the transaction fails. The second set of actions can include discarding results of data manipulations by the transaction and denying access to system resources.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, tablets, smartphones, various wireless devices and embedded systems, just to name a few.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled in the art will appreciate numerous modifications and variations therefrom. It is intended that the appended claims cover such modifications and variations as fall within the true spirit and scope of the present disclosure.

What is claimed is:

1. A computer-implemented method, executable by a management module of a computing system, comprising:
   receiving, by a processor, a plurality of transactions requesting access to system resources;
   concurrently executing, by the processor, the transactions requesting access to system resources, wherein each transaction of the transactions comprises a plurality of actions to be performed on the system resources, wherein the executing the transactions include extracting and recording the plurality of actions related the transactions;
   determining, by the processor, whether the transaction fails or succeeds, including determining, during execution of the transaction, whether changes to one or more of the system resources requested by the transaction can be successfully performed, wherein: the transaction succeeds if the changes can be successfully stored in a persistent storage and the transaction fails if the changes cannot be successfully stored in the persistent storage, wherein access to the system resources are denied during execution of the transaction;
   accessing, by the processor, to the system resources to execute a first set of the plurality of actions included in said each transaction of the transactions on the system resources in response to determining that the transaction succeeds; and executing, by the processor, a second set of the plurality of actions included in said each transaction of the transactions on the system resources to discard results of data manipulations in response to determining that said each transaction of the transactions fails while continuing to deny access to the system resources.

2. The method of claim 1, wherein executing the second set of the plurality of actions comprises discarding changes that occurred during execution of the transaction.

3. The method of claim 1, wherein the system resources include internal resources of the computing system and external resources available to the computing system, wherein the internal and external resources include at least one of storage devices, network devices, databases, and applications.

4. The method of claim 1, wherein determining if the transaction fails or succeeds includes determining whether requested changes to the resources can be successfully stored in persistent storage of the computing system.

5. The method of claim 1, wherein the first set of actions includes at least one of persisting results of data manipulations by the transaction to a database of the computing system.

6. A system, comprising:
a management module, comprising: one or more processors to:
receive a plurality of transactions requesting access to system resources, wherein each transaction of the transactions includes a plurality of actions to be performed on the system resources;
concurrently execute the transactions to determine whether the transactions succeed or fail, including determining, during execution of the transactions, whether changes to one or more of the system resources requested by the transactions can be successfully performed, wherein the executing the transactions include extracting and recording the plurality of actions related the transactions; wherein access to the system resources are denied during execution of the transactions, wherein: the transaction succeeds if the changes can be successfully stored in a persistent storage and the transaction fails if the changes cannot be successfully stored in the persistent storage;
access to the system resources to execute a first set of actions on the system resources in response to determining that said each transaction of the transactions succeeds; and
execute a second set of the plurality of actions included in said each transaction of the transactions on the system resources to discard results of data manipulations in response to determining that said each transaction of the transactions fails while continuing to deny access to the system resources.

7. The system of claim 6, wherein the first set of actions include at least one of changes to databases of the system, call to external processes, write operations to sockets and files, actions on physical devices, and messaging and notification actions.

8. The system of claim 6, wherein the second set of actions includes at least one of denying access to the requested system resources, deleting temporary files created during execution of the transaction, generating a failure indication, and discarding changes made to databases of the system.

9. The system of claim 6, wherein determining whether the transaction fails or succeeds includes determining whether requested changes to the resources can be successfully stored in persistent storage of the system storage.

10. The system of claim 6, wherein the first set of actions includes at least one of persisting results of data manipulations by the transaction to a database of the system and granting access to the system resources.

11. The system of claim 10, wherein the second set of actions includes at least one of discarding results of data manipulations by the transaction and denying access to the system resources.

12. The system of claim 6, wherein the system resources include internal resources of the system and external resources available to the system.

13. The system of claim 12, wherein the internal and external resources include at least one of storage devices, network devices, databases, and applications.

14. A non-transitory machine-readable storage medium encoded with instructions executable by a processor of a management module, the machine-readable storage medium comprising the instructions to:
receive a plurality of transactions requesting access to system resources;
concurrently execute the transactions requesting access to system resources to determine whether each transaction of the transactions fails or succeeds, including determining, during execution of the transaction, whether changes to one or more of the system resources requested by the transaction can be successfully performed, wherein the executing the transactions include extracting and recording a plurality of actions related the transactions, wherein: the transaction succeeds if the changes can be successfully stored in a persistent storage and the transaction fails if the changes cannot be successfully stored in the persistent storage;
wherein access to the system resources are denied during execution of the transaction, and said each transaction of the transactions includes the plurality of actions to be performed on a plurality of system resources;
accessing to the system resources to execute a first set of actions of the plurality of actions on the system resources in response to a determination that the transaction succeeds; and
executing a second set of the plurality of actions included in said each transaction of the transactions on the system resources to discard results of data manipulations in response to determining that said each transaction of transactions fails while continuing to deny access to the system resources.

15. The non-transitory machine-readable medium of claim 14, wherein the transaction execution instructions include instructions to: determine that the transaction succeeds if no errors occur during execution of the transaction; and determine that the transaction fails if errors occur during execution of transaction.

* * * * *